United States Patent [19]

Eckert et al.

[11] Patent Number: 4,888,997
[45] Date of Patent: Dec. 26, 1989

[54] CONTROL INPUT DEVICE

[75] Inventors: Horst Eckert, Rehburg-Loccum; Joachim Feldmann, Neustadt; Gerhard Warendorf, Wedemark, all of Fed. Rep. of Germany

[73] Assignee: WABCO Westinghouse Fahrzeugbremsen GmbH, Hanover, Fed. Rep. of Germany

[21] Appl. No.: 171,095

[22] Filed: Mar. 21, 1988

[30] Foreign Application Priority Data

Mar. 28, 1987 [DE] Fed. Rep. of Germany ....... 3710256

[51] Int. Cl.$^4$ ................................................. G01L 1/22
[52] U.S. Cl. .................................... 73/862.65; 74/512
[58] Field of Search ........... 73/862.54, 862.62, 862.64, 73/862.65, 132; 74/512, 560; 177/211; 338/5; 318/488, 551

[56] References Cited

U.S. PATENT DOCUMENTS

| 3,563,097 | 2/1971 | Roggenstein et al. | 73/862.54 X |
| 3,937,212 | 2/1976 | Fletcher | 73/781 X |
| 4,426,907 | 1/1984 | Scholz | 73/862.42 X |
| 4,695,819 | 9/1987 | Bowsher | 74/512 X |

FOREIGN PATENT DOCUMENTS 2942003 4/1981 Fed. Rep. of Germany.
3404047 8/1985 Fed. Rep. of Germany.

Primary Examiner—Charles A. Ruehl
Attorney, Agent, or Firm—J. O. Ray, Jr.

[57] ABSTRACT

The present invention teaches a control input device particularly suited to a number of applications on a motor vehicle. The device can be activated by the foot of an operator to transmit an electrical output signal which is a function of load or displacement. Such control input device includes a leaf spring mounted such that it can be bent in response to an application of a foot force. Attached to the leaf spring is a sensor which measures the bowing of the leaf spring and transmits a corresponding electrical output signal.

13 Claims, 1 Drawing Sheet

CONTROL INPUT DEVICE

FIELD OF THE INVENTION

The present invention relates, in general, to control input devices and, more particularly, this invention relates to a control input device useful in a motor vehicle to emit a variable signal to, by way of example, activate the brakes on such motor vehicle.

BACKGROUND OF THE INVENTION

When such control input devices are used, for example, in motor vehicles to emit a variable signal to activate the brake system, then it is possible for this output signal to be either an electrical voltage or a fluid control pressure signal. Such fluid pressure may be either pneumatic or hydraulic. A control input device in this application is generally activated by the driver's foot. Furthermore, when the device is used in trucks, it must be designed for heavy duty operation.

Prior to the present invention, such a control input device is taught in the prior art in German Patent DE-OS 29 37 657. This device for brake activation includes a pedal which is mounted such that it can rotate in a bearing. This device also includes stops which provide a limit for the rotational movement of the pedal. In this particular device, the rotational movement of the pedal is transmitted by means of a tappet to the brake valve proper and there it is converted into a control pressure. Such control pressure being a function of the distance or force by which the pedal was displaced. Connected in a known manner to the brake valve is a potentiometer, which can be adjusted by the brake pedal. In this manner, an electrical output voltage which is a function of the adjustment to the potentiometer by the brake pedal, can be generated.

The control input device of the prior art, as described above, with all of the required bearings, linkages, springs, stops and other accessories, is relatively complex and difficult to maintain, in addition to being rather expensive.

SUMMARY OF THE INVENTION

The present invention provides a control input device particularly well-suited for use to control a power brake system on a motor vehicle. Generally in use in this application, such device will be activated by the vehicle operator's foot. When activated, the device will emit an electrical output signal which will be a function of a load on or a deflection of the brake pedal. The control input device of this invention includes a leaf spring, which can be bowed by the pressure exerted by the vehicle operator's foot, and at least one sensor positioned to measure the bowing of the leaf spring, and then transmit an electrical output signal having a value that is representative of the amount of bowing occurring to the leaf spring.

OBJECTS OF THE PRESENT INVENTION

It is, therefore, one of the primary objects of the present invention to provide a control input device which is relatively simple in design.

Another object of the present invention is to provide a control input device which, due to its rather simple construction, is relatively easy to maintain.

Still another object of the present invention is to provide a control input device capable of transmitting an electrical output signal that can be used to activate and control a motor vehicle brake system that responds to electrical signals.

The above objects and advantages of the control input device of the present invention, in addition to various other objects and advantages of such invention, will become more readily apparent to those persons skilled in the electric control art, particularly the electric brake control art, from the following much more detailed description when such description is taken in conjunction with the attached drawing illustrations.

BRIEF DESCRIPTION OF THE INVENTION

Figure 1:
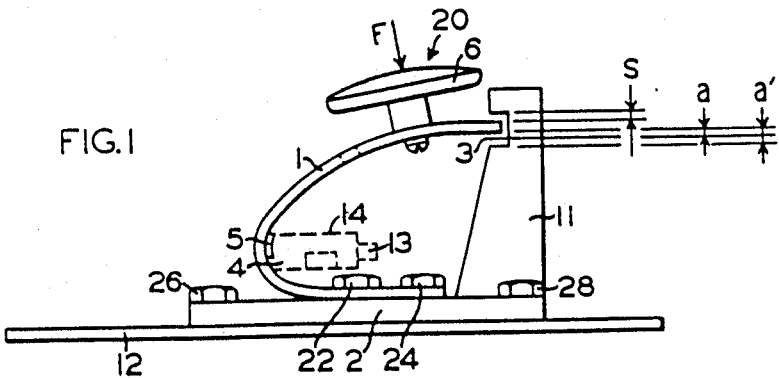
FIG. 1 is a schematic illustration of one presently preferred embodiment of a control input device constructed according to the present invention.

Prior to proceeding to the detailed description of the invention, it should be noted that identical components have been identified throughout the drawing Figures with identical reference numerals for the sake of clarity.

Now refer more particularly to FIG. 1, which illustrates one presently preferred embodiment of a control input device, generally designated 20, that is constructed according to the present invention. This control input device 20 consists essentially of a base plate member 2 having a leaf spring 1 secured thereto by bolts 22 and 24. The leaf spring 1 is bent generally into the shape of a U. A sensor 4 is positioned generally adjacent the bottom of the U in the leaf spring 1, and measures the amount of deflection which occurs to such leaf spring 1 during a brake application. A beam 11 is provided with a stop 3, which will limit the bowing which can occur to the leaf spring 1. The control input device 20 further includes a pedal means 6 secured to a leg of the U-shaped leaf spring 1. Such pedal means 6 is activated by a pressure applied thereto on the surface F by the operator's foot, for example, when the device is being used in a motor vehicle. In this case, the base plate member 2 is secured to an appropriate place on the floor 12 of the motor vehicle by means of bolts 26 and 28.

Because the sensor 4 is provided in the control input device 20 to sense the bowing of the leaf spring 1, a strain gauge 5 may be attached to the leaf spring 1 for this purpose. Strain gauges of this type are known in the prior art and, therefore, further description of such strain gauge 5 is not deemed necessary for an understanding of the present invention.

However, it should be understood by persons skilled in the measuring art that other measurement principles can also be used to advantage in determining the amount of bow in the leaf spring 1 of the control input device 20 constructed according to the present invention. Thus, for example, the displacement of the bowed leaf spring 1 could likewise be measured by a displacement measuring device. Such measuring devices and their operation are known and commercially available. One example of such known type of measuring device would be a potentiometer. Another example of a suitable measuring device would be a stationary coil with a movable core. In this case, the fixed portion of the sensor would be attached to the base plate member 2.

In addition, the amount of bowing of the leaf spring 1 can be measured optically, if desired. This could be accomplished, for example, through the use of a photoelectric-type measuring apparatus. Such an apparatus utilizes a barrier with the interposition of a light guide. This type of arrangement provides the advantage that the electronic package does not need to be located in a position that is directly adjacent the transmitter.

In the embodiment of the invention illustrated in FIG. 1, the sensor 4 is provided with a housing 14 and includes an electrical connecting means 13. Such connecting means 13 can be a plug, for example. The sensor 4 emits an electrical output signal which is a function of a load or deflection of one leg of the U-shaped leaf spring 1. Among other things, this output signal can be used, for example, to advantage to activate an electrical brake system on a motor vehicle.

The stop 3, positioned on the beam 11 that is fastened to the base plate member 2, generally ensures that the bowing of the leaf spring will always occur in the elastic range of such leaf spring 1. Therefore, the primary function of such stop 3 is to limit the travel distance of the leaf spring 1.

FIG. 1 illustrates the position of the leaf spring 1 when there is no force exerted on it. The travel distance (a) of the upper leg of the U-shaped leaf spring 1 corresponds to a pressure exerted on the leaf spring 1 from 0 to $P_{max}$. The travel distance (a') of the upper leg of the U-shnaped leaf spring 1 corresponds to the specified travel of such upper leg of the material from which such leaf spring 1 is formed during manufacture. The travel distance (s) of the upper leg of such generally U-shaped leaf spring 1 corresponds to the allowable travel of such upper leg of the U-shaped leaf spring 1 in the reverse direction.

Because of the presence of the above-described stop 3, the leaf spring 1 cannot be accidently loaded by an external application of force beyond its limit of elasticity. This provides the control input device 20 of this invention with the additional advantage that the strain gauge 5, or any other displacement sensor used, can function normally with a relatively large absolute strain since its range of operation can extend almost to the limit of elasticity.

Another distinct advantage of the control input device 20, constructed according to the present invention, is that there is no reason to fear any significant hysteresis.

In some particular configurations of the leaf spring 1, it is likewise possible to provide for progressive increases in load over displacement. This can be accomplished, for example, by providing perforations (not shown) in the leaf spring 1 or with plate springs (not shown).

In the presently preferred embodiment, the material used to manufacture the leaf spring 1 can be manufactured with a stainless guide spring steel. It is also possible to use a suitable synthetic material for such leaf spring 1. One example of such a synthetic material would be one reinforced with a glass fiber. Use of a synthetic material, for example, provides one advantage in that it would generally be easier to provide a special configuration of the leaf spring 1. An example of such a special configuration might be a leaf spring 1 having a variable thickness.

Since, in the presently preferred arrangement of the invention, the housing 14 surrounding the sensor 4 and the integrated electronic system, is located inside the curve of the generally U-shaped leaf spring 1, such sensor 4 is more likely to be protected from external mechanical influences which could have a detrimental affect on the operation of the control input device 20.

The control input device 20, particularly when it is being used in a motor vehicle braking system, can be provided with a multi-circuit capability. Such control input device 20 possesses an operational control of the sensor 4. In these cases, such control input device 20 includes a plurality of sensors installed at a predetermined position on the leaf spring 1.

Depending upon the particular safety requirements for the braking system, both active and inactive sensors can be used. In such an arrangement, the active sensors are utilized in a control manner and the inactive sensors are utilized in a monitoring application. That is, the active sensors, via amplifiers, exercise actual control over the control valves corresponding to the individual brake circuits, whereas, the inactive sensors are used only to compare and/or monitor the active sensors during operation.

In accordance with the requirements of some countries, such as the European Community, the leaf spring 1 element used in this control input device 20, would be permitted to serve as a connecting part between a pair of brake circuits.

The alternative configuration of the control input device, generally designated 30, illustrated in FIG. 1, is distinguished from the configuration of the control input device 20, illustrated in FIG. 1, only by a different arrangement for the introduction of foot power F of an operator of a motor vehicle on the generally U-shaped leaf spring 1. In this arrangement, the foot power F exerts a force on a pedal 7 that is hinged to a pivot member 32 secured to the base plate member 2. Attached to the underside of the pedal 7 is a roller 8, which rolls along an outer surface of the upper leg of the generally U-shaped leaf spring 1.

Figure 2:
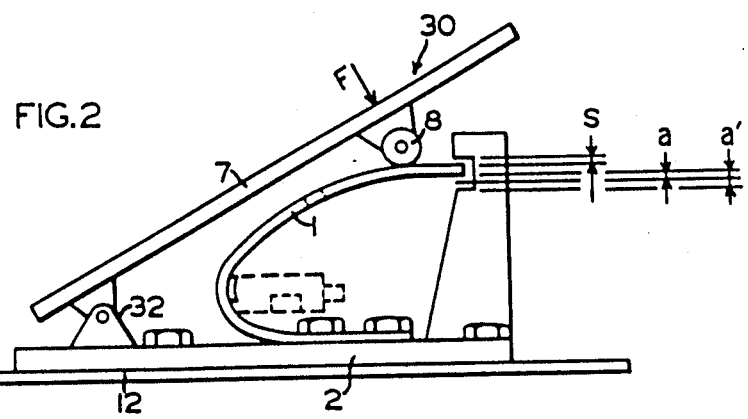
FIG. 2 is a schematic illustration of a first alternative embodiment of the control input device illustrated in FIG. 1 with a modified foot pedal.
Figure 3:
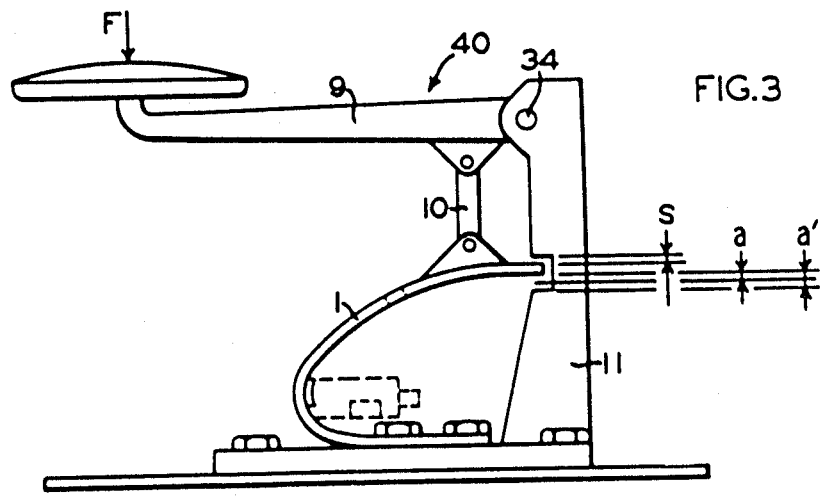
FIG. 3 is a schematic illustration of a second alternative embodiment of the control input device illustrated in FIG. 1 with a still different foot pedal.

According to the alternative embodiment of the control input device, generally designated 40, illustrated in FIG. 3, the foot power F of the operator of the motor vehicle is introduced to the generally U-shaped leaf spring 1 by means of a lever 9. Such lever 9 is pivotally-mounted in hinged bearing 34 at the upper end of the beam 11. The force, causing movement of the lever 9, is transmitted to the leaf spring 1 by means of a connecting member 10. One end of the connecting member 10 is pivotally-connected to a bottom surface of the lever 9, and the opposite end of the connecting member 10 is pivotally-connected to an outer surface of the upper leg of the generally U-shaped leaf spring 1. The various alternative embodiments of force transmission to the leaf spring 1, which are illustrated in FIGS. 2 and 3, will ensure a greater constancy of the application of such force to such leaf spring 1. However, it should be noted that they will result in some degree of hysteresis. Such degree of hysteresis is, however, within an acceptable limit.

Furthermore, it should be noted that in the alternative embodiments of the control input device 30 and 40, which are illustrated in FIGS. 2 and 3, respectively, some control of the load-deflection curve can likewise be achieved through an appropriate design of the hinge geometry, if desired, for a particular end application of such control input device 20 or 30.

It should also be noted by those persons skilled in the art that even though the leaf spring 1 in each of the illustrated embodiments of the control input device is shown generally bent in the shape of a U, it can also be bent in other ways, or its could even be straight. An example of another shape for such a leaf spring 1 is an S-shape.

Each of the control input devices illustrated according to the present invention, in addition to their use as a braking force transmitter, can also be used as a transmitter for the fuel, the clutch, and/or other servo-activated devices. It can be seen from the above description that the control input device of the present invention can achieve the objects of the present invention and can be manufactured very economically because of its relatively simple design.

While both a presently preferred as well as a number of alternative embodiments of the control input device of the present invention have been described in detail above, it should be obvious to persons who are skilled in the control art, that various other modifications and adaptations of the control input device can be made without departing from the spirit and scope of the appended claims.

We claim:

1. A control input device which measures and transmits an electrical output signal that is a function of one of a load and a deflection, said control input device comprising:
   (a) a base plate member;
   (b) a leaf spring having a generally U-shaped bend, one leg of said leaf spring being secured to said base plate member and the other leg being free;
   (c) a beam member;
   (d) stop means carried by said beam member for limiting the amount of deflection of said other leg from a normal position in which said leaf spring is free of stress, said stop means comprising a recess in said beam member into which the end of said other leg of said leaf spring projects so as to lie in spaced-apart relationship with the opposing walls of said recess in said normal position thereof, thereby limiting the degree of deflection of said other leg in opposite directions from said normal position; and
   (e) at least one sensing means engaging said leaf spring for providing said electrical signal having a value corresponding to the degree of bowing of said leaf spring in response to a force F being applied at said other leg adjacent the end thereof.

2. A control input device, according to claim 1, wherein said sensing means includes at least one strain gauge secured to a predetermined surface of said leaf spring.

3. A control input device, according to claim 2, wherein said sensing means includes a housing surrounding said strain gauge.

4. A control input device, according to claim 3, wherein said control input device includes an integrated electronic system positioned within said housing to provide amplification and processing of said electrical output signal of said sensing means.

5. A control input device, according to claim 1, wherein a load-deflection curve of said leaf spring is progressive.

6. A control input device, according to claim 5, wherein said leaf spring includes at least one perforation to provide said load-deflection curve.

7. A control input device, according to claim 5, wherein said control input device further includes a hinged pedal engageable with said leaf spring to provide said load-deflection curve.

8. A control input device, according to claim 1, wherein said leaf spring is one of a spring steel and a fiber-reinforced plastic.

9. A control input device, according to claim 8, wherein said spring steel is stainless.

10. A control input device, according to claim 8, wherein said leaf spring is fiber-reinforced plastic.

11. A control input device, according to claim 1, wherein said control input device further includes a pedal plate secured directly to said leaf spring for enabling said application of said force F.

12. A control input device, according to claim 1, wherein said control input device further includes a pedal hinged to said base plate for enabling said application of said force F, said pedal having a roller secured thereto which engages said leaf spring.

13. A control input device, according to claim 1, wherein said control input device further includes a lever pivotally hinged to said beam to enable said application of said force F through a pivotal connection between said lever and said leaf spring.

* * * * *